June 17, 1941.    J. L. CHANEY ET AL    2,246,241
THERMOMETER
Filed July 15, 1940
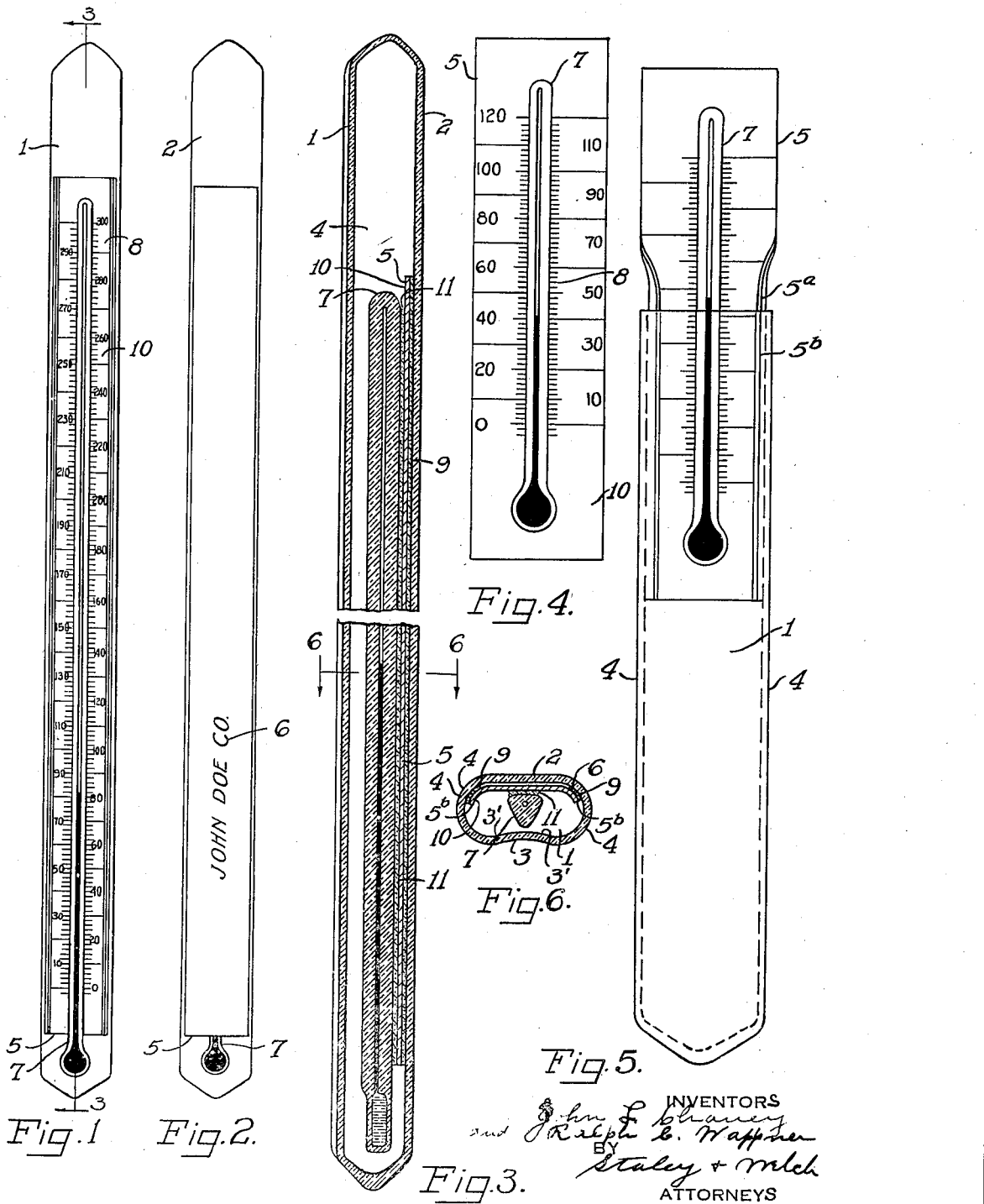

Patented June 17, 1941

2,246,241

UNITED STATES PATENT OFFICE 2,246,241

THERMOMETER

John L. Chaney and Ralph C. Wappner, Springfield, Ohio

Application July 15, 1940, Serial No. 345,536

1 Claim. (Cl. 73—374)

This invention relates to thermometers of the type in which the bulb and indicia chart are located in a transparent casing.

One of the objects of the invention is to provide a casing for a thermometer of the type referred to which will facilitate to a great degree the reading of the indicia upon the chart.

A further and more specific object is to provide a casing for a thermometer of the kind referred to in which the front wall of the casing is so shaped as to direct the light rays to a better degree upon that portion of the chart which bears the indicia so as to furnish an improved vision of the chart indicia.

In the accompanying drawing:

Fig. 1 is a front elevation of a thermometer embodying the improvements.

Fig. 2 is a rear elevation of the same.

Fig. 3 is a longitudinal section on the line 3—3 of Fig. 1.

Fig. 4 is a front elevation of the thermometer tube and its chart, the tube and chart in this figure being shown of shorter length than the ones in Fig. 1.

Fig. 5 is a front elevation of the casing, tube and chart showing the manner of assembling the parts.

Fig. 6 is an enlarged section on the line 6—6 of Fig. 3.

Referring to the drawing, 1 represents a transparent casing which encloses the thermometer tube and its chart, this casing being preferably formed of glass. This casing has a cross-section substantially like that shown in Fig. 6 in which it will be seen that the casing is elongated in a transverse direction and has a substantially flat rear wall 2, a front wall 3, a portion of which is concavo-convex in shape, and sides which are substantially semi-circular as indicated at 4. The concavo-convex portion is indented so that the outer surface thereof is concave and the inner surface thereof convex.

Located within the casing closely adjacent the rear wall 2 and a portion of the curved ends of the casing is a chart 5 which bears suitable temperature indicia on its front side; its rear side being observed through the rear wall of the casing and suitable for the purpose of bearing advertisements or other matter as indicated at 6 in Fig. 2. Secured to the chart and centrally positioned thereon is a thermometer tube 7 of well known form and construction, this tube being secured to the chart by any suitable adhesive material indicated at 11.

After the thermometer tube has been secured to the chart the chart and tube are slipped into the casing from its upper end as shown in Fig. 5, the sides of the chart are then secured to the rounded portions of the casing by injecting a suitable adhesive material in liquid form by the aid of a suitable liquid injector such for instance as an instrument constructed like an ordinary hypodermic needle with the needle of such length as to extend to the lowermost portion of the chart if desired.

Before the chart and tube have been placed in the casing the lower end of the casing is sealed in any well known way and after the chart and tube have been placed in the casing and the chart secured therein the upper end of the casing is then sealed in any well known way, the preferable manner of sealing being by heating the ends of the casing to a fusing point.

The advantage of a casing formed of an elongated character over that of a cylindrical casing is that the light rays are more efficiently directed to the indicia on the chart, these indicia being necessarily located at the sides of the centrally positioned thermometer tube. As the transverse width of the casing however must be confined to reasonable limits and as the chart and indicia thereon must be of such dimensions as to make the indicia readily readable, it has been found necessary to locate the sides of the chart partly within the curved side portions of the casing so that even with a casing which had greater cross-sectional dimensions than the depth thereof, the light rays would not be directed upon the indicia in a way to provide for the best vision in the event that the front wall was substantially flat like the rear wall. In order, therefore, to provide for a more improved vision of the indicia which are located at the sides of the chart, it has been found that by forming the front wall of the casing of a substantially concavo-convex shape substantially like that shown the light rays will be directed more efficiently toward those portions of the chart which are located within portions of the curved sides of the casing, that portion of the concavo-convex front wall which so direct the rays being indicated at 3'.

By the manner of securing the thermometer tube to the chart before installation and the manner of inserting and securing the side edges of the chart to the tube an improved and cheaper construction is provided.

Having thus described our invention, we claim:

In a thermometer, a casing, a thermometer tube and indicia bearing member located in said casing, said casing being elongated as to width, the front wall of said casing being transparent and having an elongated indentation the front face of which is substantially concave and the inner face of which is substantially convex.

JOHN L. CHANEY.
RALPH C. WAPPNER.